(12) United States Patent
Dean et al.

(10) Patent No.: US 6,275,180 B1
(45) Date of Patent: Aug. 14, 2001

(54) COLLISION WARNING SYSTEM

(75) Inventors: Michael Dean; Robert D Hodges, both of Malvern (GB)

(73) Assignee: The Secretary of State for Defence, in Her Britannic Majesty's Government of the United Kingdom of Great Britain and Northern Ireland, Farnborough (GB)

(*) Notice: Subject to any disclaimer, the term of this patent is extended or adjusted under 35 U.S.C. 154(b) by 0 days.

(21) Appl. No.: 09/117,269

(22) PCT Filed: Jan. 31, 1997

(86) PCT No.: PCT/GB97/00276

§ 371 Date: Jul. 27, 1998

§ 102(e) Date: Jul. 27, 1998

(87) PCT Pub. No.: WO97/29388

PCT Pub. Date: Aug. 14, 1997

(30) Foreign Application Priority Data

Feb. 5, 1996 (GB) .................................................. 9602250

(51) Int. Cl.[7] .............................. G01S 13/93; G01S 13/00
(52) U.S. Cl. ................................. 342/70; 342/27; 342/71; 342/128; 342/133; 342/175; 342/195; 342/196
(58) Field of Search ................................. 342/27–32, 41, 342/70–72, 175, 192–197, 118, 128, 133; 455/78, 79, 80, 81; 343/772, 783

(56) References Cited

U.S. PATENT DOCUMENTS

| 4,150,375 | | 4/1979 | Ross et al. |
|---|---|---|---|
| 4,231,038 | * | 10/1980 | Holford ................................ 342/175 |
| 4,259,743 | * | 3/1981 | Kaneko et al. ........................ 455/81 |
| 4,571,593 | * | 2/1986 | Martinson ............................. 343/783 |
| 5,045,856 | * | 9/1991 | Paoletti ................................. 342/70 |
| 5,497,162 | | 3/1996 | Kaiser ................................. 342/159 |

FOREIGN PATENT DOCUMENTS

| 27 34 998 | 2/1978 | (DE) . |
|---|---|---|
| 195 11 210 | 9/1995 | (DE) . |
| 0 658 775 | 6/1995 | (EP) . |
| 2 279 179 | 12/1994 | (GB) . |
| 2 299 722 | 10/1996 | (GB) . |

OTHER PUBLICATIONS

Lissell et al., "Radar Sensor for Car Applications", IEEE Proceedings of the Vehicular Technology Conference, vol. 1, Jun. 8, 1994, pp. 438–442.

Stove, A.G., "Obstacle Detection Radar for Cars", Electronics and Communication Engineering Journal, vol. 3, No. 5, Oct. 1, 1991, pp. 232–240.

\* cited by examiner

Primary Examiner—Bernarr E. Gregory
(74) Attorney, Agent, or Firm—Nixon & Vanderhye P.C.

(57) ABSTRACT

A collision warning system (10) discriminates between objects which pose a threat of collision from those which do not by measuring the relative sightline rate of the object, this being a measure of the rate of change of angular position of the object if the sightline rate is above a threshold value, there is little risk of collision. To measure the sightline rate, a radar source (20) emits microwave frequency radiation which is received by two detectors (22 and 24) after reflection from a target. Signals from the detectors are processed by processing means (26). The processing means determines if the sightline rate of an object is below a certain threshold. If it is, and the relative velocities of the object and the system are such that a collision is likely, a warning buzzer (28) sounds.

10 Claims, 8 Drawing Sheets

COLLISION WARNING SYSTEM

BACKGROUND OF THE INVENTION

1. Field of the Invention

The present invention relates to a system for providing a collision warning.

2. Discussion of Prior Art

There is currently world-wide interest in the production of systems for providing a vehicle collision warning. Projected capabilities range from relatively simple "intelligent cruise control" systems, to more complex systems capable of searching the road ahead and alerting/acting on the presence of a potential hazard. For all weather performance, particularly in dense fog, a radar sensor is particularly beneficial.

Considerable problems must be overcome before a truly cost-effective radar based system can be produced. Particularly important problems of implementation are:

a. false alarms from vehicles in adjacent lanes and "road furniture" (street signs, lamp standards etc.);
b. mutual interference between radar systems;
c. reliably discriminating vehicles and structures which are a potential hazard from those which are not an immediate safety threat; and
d. producing a cost-effective hardware configuration which will cope with the above problems Several research organizations have been involved in developing collision warning radar systems. A. G. Stove of the Philips Research Laboratories in Electronics and Communication Engineering journal, October 1991, pages 232–240 provides a review of the use of radar in vehicle collision warning systems. Such systems generally comprise a microwave transceiver for transmitting and receiving radar signals, a signal processor for Identifying potential obstacles, and a form of man-machine interface such as a display for informing the driver of the vehicle. The system generates a radar map of all the obstacles within the field of view of the transceiver and then extracts those obstacles which are a potential threat for display.

In certain situations, such as rounding a bend, an obstacle rich environment in front of the vehicle may be measured although there is no real danger presented to the vehicle, provided it negotiates the bend. The signal processing capability required to cope with such an obstacle rich environment is considerable and adds to the complexity and expense of such systems. The vehicle component market is extremely price sensitive and the reduction of unit cost is of critical importance.

European Patent Application number 0 473 866 A2 describes an optical system in which the range and angle of target vehicles are monitored and these are passed to a processor which monitors each target vehicle and determines a predicted separation distance from the target vehicles to the system. Such a system would require a processor having a substantial data processing capacity to cope with monitoring each target vehicle even when the majority of the target vehicles do not present a collision hazard.

It is known, for example in United Kingdom patent specification number 1 313 402 that the necessary and sufficient condition for a collision of a first moving body with a second stationary or moving body is that the relative separation of the bodies decreases with time whilst the relative bearing of the second body measured from the first body remains constant.

United Kingdom patent specification number 1 605 171 describes an aircraft based system for determining the clearance of the aircraft from a landscape feature by determining the angle below the flight line of the aircraft of a sightline from the aircraft to the feature, the ground speed of the aircraft and the rate of increase of the angle of the sightline below the horizontal.

In German patent specification number DE 27 34 998, a Doppler radar system for vehicle collision avoidance is described. The system comprises an emitter/receiver unit comprising a first antenna and a second antenna. The unit is arranged to emit radiation towards a scene in a direction in which a vehicle incorporating the system is traveling. Moreover, the unit is arranged to receive radiation reflected from a target at two spatially separated left and right points on the vehicle, where the first antenna and the second antenna are located respectively, and to generate first and second Doppler signals respectively in response thereto. The first and second Doppler signals have a frequency proportional to relative velocity between the target and the first and second points on the vehicle respectively. The system also incorporates a phase change switch connected to the emitter/receiver unit for determining the phase difference between the first and second Doppler signals, and a switch for producing a reply signal from interrogating the amplitude and phase difference of the Doppler signals. Moreover, the system incorporates a reply signal switch comparator for generating an alarm signal when the reply signal lies within a set range. In operation when the system interrogates the scene, the first antenna emits radiation towards the scene whilst the second antenna receives radiation reflected therefrom to provide the first Doppler signal. The system then commutates so that the second antenna emits radiation towards the scene whilst the first antenna receives radiation reflected therefrom to provide the second Doppler signal. This system has a disadvantage that a commutator is required for switching the antennae which adds to cost of the system.

European Patent Application number EP 0 658 775 A describes an anticollision system for determining variation in sightline angle of potential obstacles to said system. The system incorporates at least two antennae which are arranged to emit radiation sequentially, one after the other. The system also incorporates means for conserving instantaneous phase information relating to echoes received from the obstacles at the antennae to obtain a Doppler signal which contains information relating to sightline angle of the obstacles relative to the system. Moreover, the system employs commutating means for commutating the signals from the antennae; commutation involves switching between the signals received at the antennae, namely keeping the signals separate and selecting amongst them.

A problem with the systems described in German patent specification number DE 27 34 998 and European Patent Application number EP 0 658 775 A is that only a single antenna receives radiation reflected from the scene at any particular time. As a result, a situation may arise where an object on a collision course with one of these systems has a trajectory which is not in a field of view of the antenna in the system arranged to receive radiation. This may result in a situation where the object is not detected and subsequently collides with the system.

SUMMARY OF THE INVENTION

It is an object of the invention to provide a collision warning system which provides more reliable detection of objects likely to collide with the system.

The present invention provides a collision warning system comprising:

(i) a source of radiation;
(ii) receiving means for receiving radiation emitted by the source and reflected by an object in its field of view and for generating receive signals in response thereto; and
(iii) processing means for processing said signals to determine whether or not an object presents a collision risk, said processing means comprising means for determining from receiver signals a measure of object sightline rate and means for rejecting signals associated with objects having a sightline rate greater than a set value in order to distinguish between objects which do and do not present collision risks, sightline rate being rate of change of angular position with respect to the system, characterized in that (a) the receiving means comprises a plurality of receivers; and
(b) the processing means includes combining means for combining signals from different receivers to generate composite signals and provide for the receiving means to have a plurality of polar sensitivity responses associated with respective composite signals such that no direction within the system field of view is associated with a null of every polar sensitivity response.

The present invention provides an advantage that radiation reflected form the object is more likely to be detectable in at least one of the composite signals thereby increasing probability of object detection.

The present invention discriminates between objects which pose no threat of collision and objects with which collision is considered likely on the basis of a measurement of the rate of change of angular position of the object with respect to the measuring system. This rate is known as the sightline rate. Objects with a low sightline rate are those which are at an angular position to the measuring system which is slowly changing with time. If the object is approaching the measuring system and the sightline rate is low, then collision is likely. Objects which exhibit a high sightline rate are unlikely to be a threat unless they are moving at a high relative speed or they are at close range. Whilst the invention is identified as a collision warning system, such systems need not provide a physical warning such as an audible or visual signal but may provide a warning to a control system which uses the warning to control the motion of a vehicle carrying the system, for example applying brakes of the vehicle.

If the receiver signals of two laterally separated receivers are added together, the resultant composite signal has an interference type characteristic with the sensitivity to received radiation having an angular distribution of sensitivity maxima separated by sensitivity minima. This characteristic may be used to obtain a measure of a target object's sightline rate. As the target object passes through angles corresponding to sensitivity minima, the signal to noise ratio of the signals is low and the phase of the signals will be essentially random. The second differential with respect to time of the signal phase may be used to compare with a threshold value to determine whether a target object's sightline rate exceeds a set value.

With at least two laterally separated receivers, the sightline rate of target objects may be determined. In the case of an automobile collision warning system, separating two receivers by the width of the automobile provides a suitable separation for angle determination. Such angular determination may be performed by analysing the phases of receiver signals, although other techniques might be employed.

It may be shown that a miss distance Z for an object at a range R and a relative velocity V and a sightline rate $\omega_s$ may be determined by the equation (1)

$$Z = \frac{\omega_s R^2}{V} \qquad (1)$$

A collision warning system which discriminates objects according to their sightline rate where only those objects which pose a threat are detected and all other objects are rejected as early as possible provides the advantage that complex threat assessment processing is not required.

In situations where many objects are detected, prior art collision warning systems which determine a collision risk on the basis of an object's track history may overload, leading to false alarms or missed threats. Particular problems with track processing systems occur when the vehicle carrying the system enters a bend in the road. Furthermore, the need to discriminate between many objects in the field of view may lead to a requirement for high range resolution. Such systems may be very complex and hence expensive to implement.

The collision warning system of the invention may incorporate means for controlling the frequency of the source such that it is orientation dependent. Such a system might provide benefits in avoiding confusion between systems of other vehicles.

The receivers of the invention may be conventional horn-type receivers. Focal plane array systems might also be used, with angular sensitivity being enhanced by having antenna elements at the focal plane of the receiver which have respective look directions.

In a further aspect, the invention provides a collision warning system for providing a collision warning arranged to distinguish objects presenting a collision hazard from objects which do not present an immediate collision hazard by measurement of each object's sightline rate, the sightline rate being the rate of change of the angular position of the object with respect to the system; said system including:

(a) at least one source of radiation;
(b) receiving means for detecting the radiation after reflection from an object and for generating signals in response thereto; and
(c) signal processing means for determining the sightline rate of an object from the signals;

characterised in that the receiving means comprises a plurality of detectors linked so as to provide detection means having a sensitivity to received radiation which is incident angle dependent. The system provides an advantage of angle dependent sensitivity to received radiation and improved object detection.

A reduced frequency signal may be generated at the detectors which is then processed further. Typically, the system emits a frequency modulated continuous wave signal. The reduced frequency signal may be passed to a fast Fourier transform unit, the complex output of which includes a phase angle. By calculating a second time derivative of the phase angle, the sightline rate of detected objects may be compared with a threshold value. Objects having a sightline rate above the threshold value do not pose a risk of collision and may be rejected. Objects with a sightline rate below the threshold may pose a collision risk, and so signals from these objects are processed further to determine whether they are, for example, within a safe braking distance of a vehicle carrying the system.

Microwave detectors in the form of focal plane receivers with a plurality of antenna elements provide a degree of angular sensitivity. A focal plane receiver may include non-radiative means for coupling a local oscillator signal to signal mixing means.

In order to reduce interference to the system from other collision warning systems, for example mounted on vehicles, the frequency of emitted radiation may be varied according to the direction of travel of the system. A magnetic compass may be used to control a master oscillator so that for a particular angle of magnetic bearings, a particular frequency is emitted.

In another aspect, the invention provides a collision warning system comprising a radiation source, means for receiving reflected radiation and for generating signals in response thereto and means for processing the signals to determine a collision risk, wherein the radiation source provides means for emitting radiation whose frequency is dependent upon an orientation of the system.

In a further aspect of the invention, there is provided a receiver element for receiving microwave radiation, for mixing the received radiation with a local oscillator signal and for extracting an intermediate frequency signal, characterized in that the element comprises receiving means for receiving the radiation and coupling means for coupling the local oscillator signal to the receiving means and for extracting the intermediate frequency signal, the coupling means comprising conducting means for carrying the local oscillator signal from a source to the receiving means and for carrying the intermediate frequency signal from the receiving means and a plurality of diodes connecting the conducting means to the receiving means.

BRIEF DESCRIPTION OF THE DRAWINGS

In order that the invention may be more fully understood, embodiments thereof will now be described, by way of example only, with reference to the accompanying drawings, in which.

DETAILED DISCUSSION OF PREFERRED EMBODIMENTS

Figure 1:
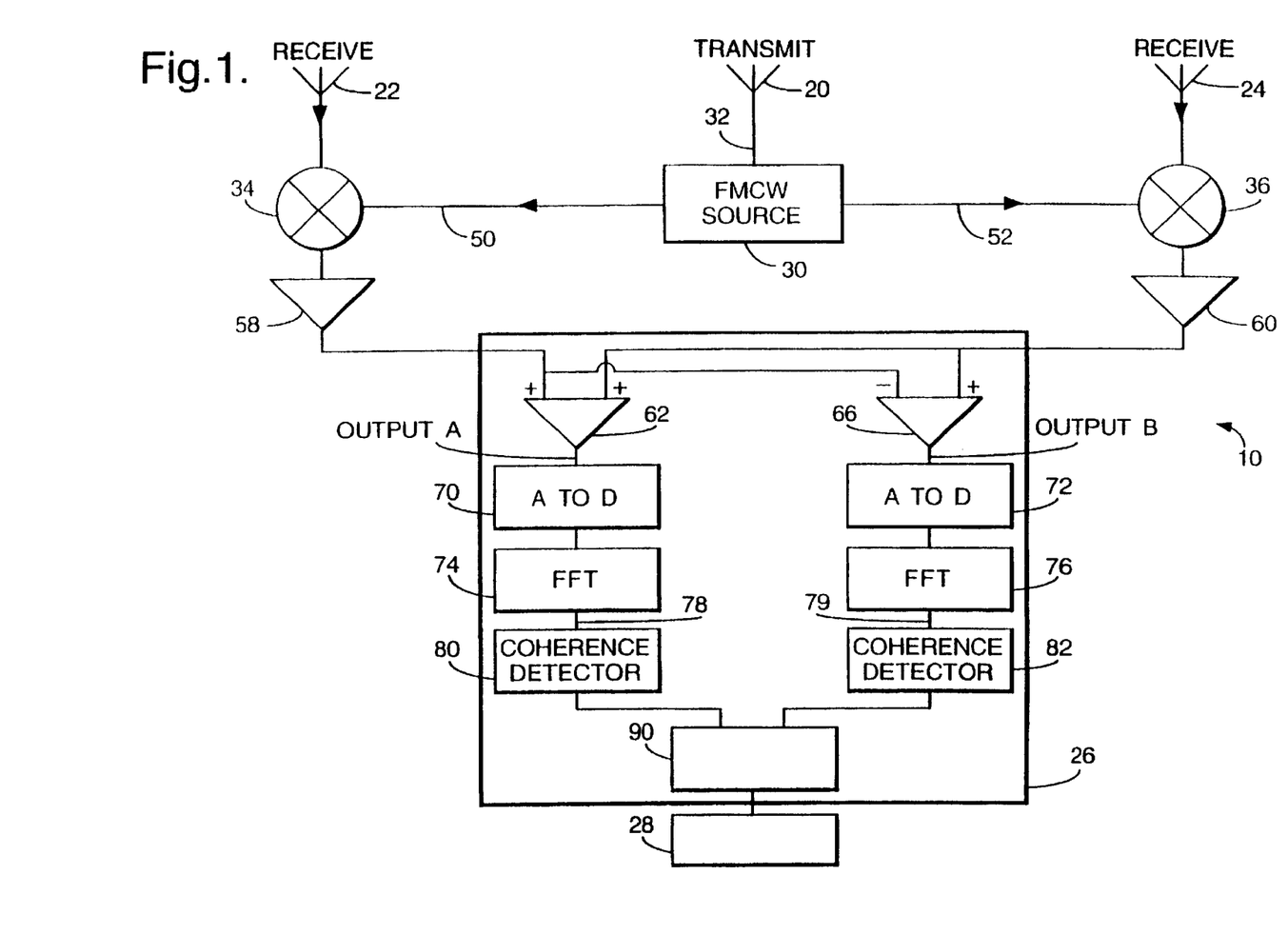
FIG. 1 is a schematic diagram of a system of the invention.

Referring to FIG. 1 there is shown a collision warning radar system indicated generally by 10 which would be mounted on a vehicle. The system 10 includes a microwave transmit antenna 20, two microwave receive antennas 22 and 24, and a signal processor 26 connected to a warning buzzer 28. The microwave transmit antenna 20 is a conventional waveguide horn emitting microwave radiation having a frequency in the range 76 to 77 GHz. The transmit antenna 20 produces a radar beam which is 10° wide in azimuth. The radar beam is a transmitted signal which is a single sweep linear frequency modulated continuous wave (FMCW) signal, as described by Stove in the previously referenced article. The FMCW signal is generated by a source 30 and passed to the transmit antenna 20 via a transmission line 32. The receive antennas 22 and 24 are separated laterally by a distance of 1.2 meters and are each a horn type antenna having an angle of sensitivity of 10° to match the beamwidth of the transmit antenna 20.

The FMCW signal from the source 30 is passed lo signal mixers 34 and 36 via respective transmission lines 50 and 52. Signals emitted by the transmit antenna 20 and received by the receive antennas 22 and 24 after reflection from an object are mixed by the mixers 34 and 36 with the original FMCW signal from the source 30 to produce respective video-frequency outputs. The outputs pass to respective amplifiers 58 and 60. The resulting outputs from the two amplifiers are added together produce an output A and subtracted one from the other to produce an output B. Output A is produced by a summing amplifier 62 which adds the outputs of the amplifiers 58 and 60 directly. The outputs of the amplifiers 58 and 60 are also passed to an operational amplifier 66 which generates an output signal proportional to the difference between its two inputs. The operational amplifier 66 generates the output B The analogue signals of outputs A and B are each digitised by a respective one of two analogue to digital converters 70 and 72 and thence processed in a respective one of two Fast Fourier Transform (FFT) units 74 and 76 to extract object range information from the outputs as in a conventional FMCW radar system.

The system 10 is constructed so as to have a maximum range of 200 meters. This 200 meter operating range is divided into eight 25 m range gates. The FFT units 74 and 76 each process the digitised input signals. Each FFT unit 74 and 76 has eight outputs, corresponding to the eight range gates. For ease of illustration, only one output is shown from each FFT unit in FIG. 1. If an object is present in a particular range gate, each of the FFT units generates a complex number output signal on the output corresponding to that range gate. The amplitude of the output signal provides an indication of the object's size and the chase angle of the signal is a function of the object s range from the radar system.

The eight outputs of each FFT unit 74 and 76 are connected to a respective coherence detection unit. In FIG. 1, for ease of illustration, only a single output 78 from the FFT unit 74 and a single output 79 from the FFT unit 76 are shown connected to respective coherence detection units 80 and 82. The radar system 10 has seven other coherence detection units connected to each FFT unit which are not shown. The coherence detection units 80 and 82 compare the phase angles of successive output signals of the FFT units 74 and 76 and reject signals from objects which do not pose a risk of collision as will be described later. Coherence detectors have seen described by G. C. Goddard in a paper in the Proceedings of the IEE Colloquium on Adaptive Thresholding, London, England, Mar. 25, 1981, pages 9.1 to 9.6.

Signals which are not rejected by the coherence detection units and which therefore indicate objects of significant collision risk are passed to a signal processor 90. The signal processor 90 compares the range of these objects with the speed of the automobile carrying the radar system 10. If the object is within a distance equal to the stopping distance of the automobile plus the distance which would be travelled in a two second warning period, the warning buzzer 28 is activated.

Figure 2:
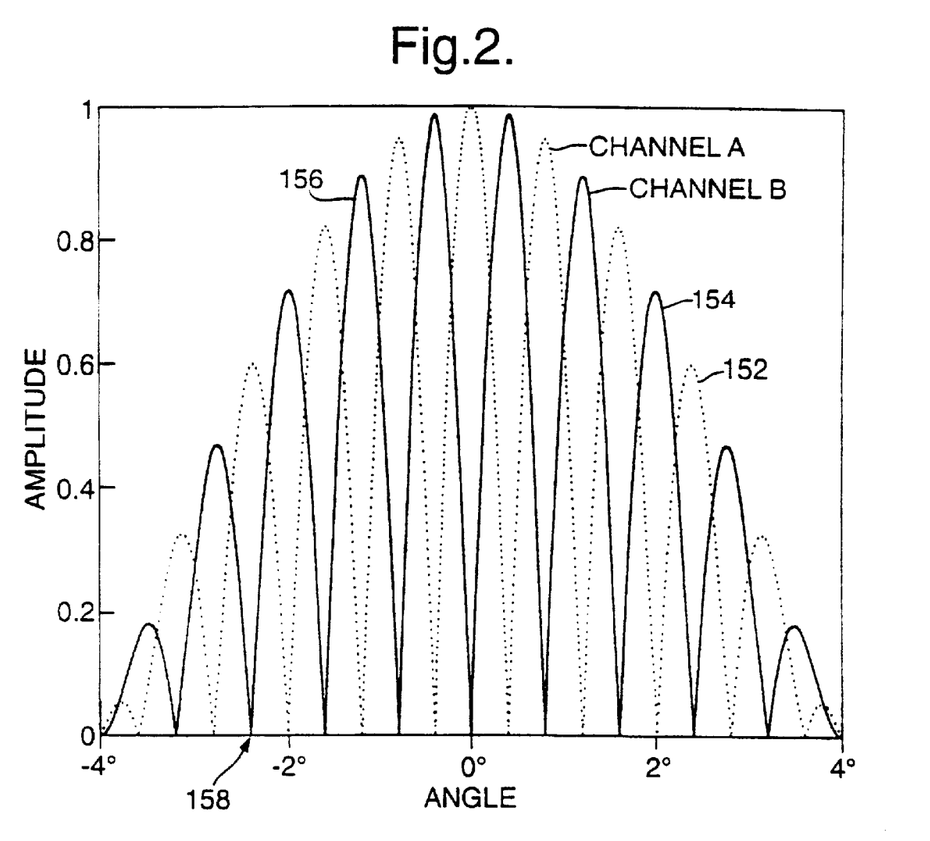
FIG. 2 shows a receiver beam pattern of the FIG. 1 system.

Referring to FIG. 2 there are shown receiver beam patterns for the outputs A and B. A dotted line 152 indicates the receiver beam pattern of output A and a solid line 154 indicates the receiver beam pattern of output B. The receiver beam patterns indicate the sensitivity to objects of the outputs as a function of angle. The receiver patterns comprise a series of lobes, such as a lobe 156 separated by nulls such as a null 158. The nulls occur at angles $\theta_n$, where for small angles away from a central direction as required for a collision warning radar:

for channel A $\quad\quad \theta_n + \phi = \dfrac{n\lambda}{L} \quad\quad n = 0, 1, 2, 3 \ldots$ (2)

for channel B $\quad\quad \theta_n + \phi = \left(n + \dfrac{1}{2}\right)\dfrac{\lambda}{L} \quad\quad n = 0, 1, 2, 3 \ldots$ (3)

where
$\lambda$ is the wavelength corresponding to the operating frequency;
L is the spacing between the receive antennas 22 and 24; and
$\phi$ is an arbitrary offset angle determined by the relative phasing of the receive antennas 22 and 24.

Objects with low sightline rates will remain within a single lobe of the composite antenna patterns of FIG. 2 between successive measurements. Objects with more than a certain minimum sightline rate will pass through at least one null on either channel A or B between successive measurements. The two channels A and B are necessary in order to ensure the detection of objects with low sightline rates at angles which correspond to nulls in either of the channels. The relative phase between the local oscillator signals to the two receivers may be quite arbitrary, with the antenna pattern of FIG. 2 being shifted as a whole relative to an antenna assembly boresight.

Referring now to FIG. 3, the operation of the coherence detection units 80 and 82 of FIG. 1 will now be described. Objects having a low sightline rate and a high signal to noise ratio have a phase history in which the phase of the received signal changes linearly with time. The phase history of noise is totally random. If an object has sufficient sightline rate to pass through one or more nulls in the receive antenna pattern, where the signal to noise ratio is low, the phase history will have regions where it becomes random.

Figure 3A:
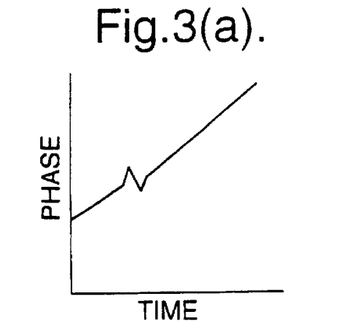
FIGS. 3(a)–3(f) are a series of graphs illustrating the operation of the FIG. 1 system.
Figure 3B:
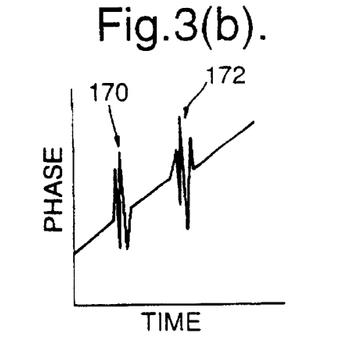
Figure 3C:
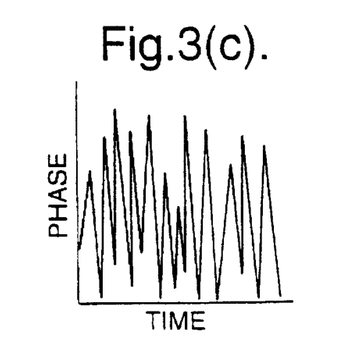

FIG. 3(a) shows a graph of the phase angle of a signal from an object with a low sight line rate against time. The phase history of this object is essentially linear. FIG. 3(b) shows a graph of the phase angle against time of a signal from an object with a sightline rate sufficient to have passed through two nulls in the receiver antenna pattern. The phase history shown in FIG. 3(b) has two regions 170 and 172 where the phase history is random, corresponding to the times where the object was at angles relative to the radar system corresponding to receiver antenna nulls. FIG. 3(c) shows the phase history of noise alone, where the phase history is random throughout the processing interval. FIGS. 3(b) and 3(c) represent the phase histories measured during processing intervals where objects presenting a hazard were not detected.

Figure 3D:
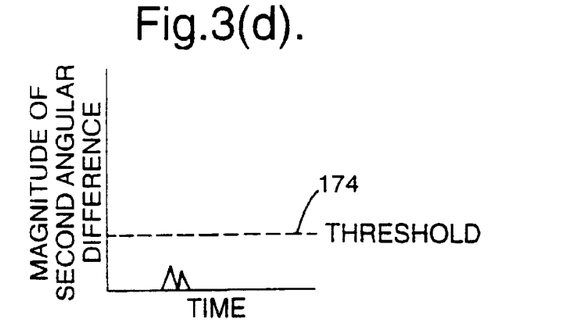
Figure 3E:
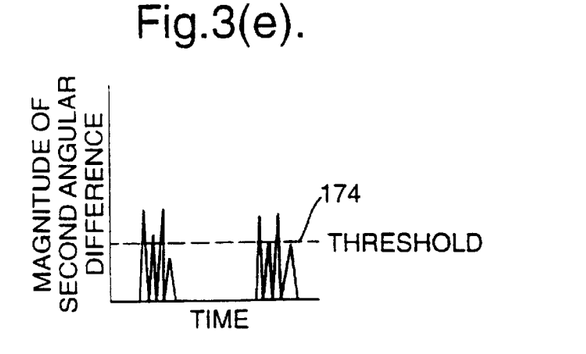
Figure 3F:
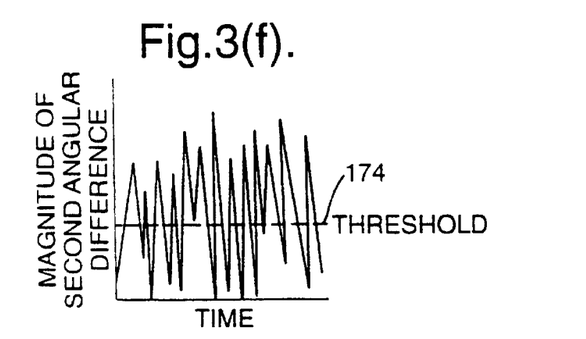

In order to distinguish phase histories such as that shown in FIG. 3(a) from phase histories such as those shown in FIG. 3(b) and FIG. 3(c) which may be rejected, the phase history is differentiated twice with respect to time to obtain a measurement referred to here as the second angular difference. The magnitudes of variations in the second angular difference are compared with a predetermined threshold. FIG. 3(d) shows a graph of the second angular difference against time for the measurements shown in FIG. 3(a). The predetermined threshold is represented by a dashed line 174. Since the phase history in this instance is substantially linear, the second angular difference is always close to zero and does not cross the line 174. The second angular differences of the cases shown in FIGS. 3(b) and 3(c) produce crossings of the threshold, as shown in FIGS. 3(e) and 3(f) respectively.

One criterion for distinguishing objects which pose a threat from other objects is whether the object passes through no more than one third of the angular distance between nulls in the patterns of FIG. 2 during a coherence detector processing interval $T_p$. Under these conditions, an object return should be detected in at least one of the channels A or B. This sets an upper limit on the sightline rate such that:

$$\omega_s < \dfrac{\lambda}{3LT_p}.$$ (4)

Combining equations (1) and (4), the following limit on the coherence detector processing interval is obtained:

$$T_p < \dfrac{\lambda R^2}{3LZV}.$$ (5)

Each of the FFT outputs corresponds to a particular range R. For a given range and closing velocity, equation (5) enables a minimum hazard miss distance to be specified by varying the coherence detector processing time for the FFT output which corresponds o that range. In practice, however, the coupling between range information and Doppler shifting inherent in FMCW radar operation results in a distortion of the apparent range of an object. A further consequence of this coupling is that a single sweep FMCW radar will give incorrect information on the relative velocity of potential hazards. In practice, these errors will usually be small.

In an alternative embodiment, the single sweep FMCW signal may be replaced by a FMCW signal which has both an upsweep and a downsweep. Such signals enable separate range and relative velocity information to be obtained. A system incorporating upsweep and downsweep FMCW would require signal processing modified from that of the system 10 to separate the range and velocity information prior to coherence detection Often radar transmitters and receivers have a beam pattern which comprises a main beam flanked by one or more sidelobes. Sidelobes are unsatisfactory in a collision warning radar system since it would not be possible to distinguish objects which present a hazard from objects which although they are close are not an immediate safety threat. For example, a vehicle which is immediately on the offside or nearside of the radar carrying vehicle could present an object with apparently no relative velocity and very close range if it were in the radar sidelobes, and would be indistinguishable from a close range object in front of the radar carrying vehicle. The object would appear to intrude within the safe braking distance and would cause an alarm. Radar antenna sidelobes may be reduced by placing the antenna assembly at one end of a tube of radiation absorbing material. Although this would narrow the field of view unacceptably for most radar applications, the required field of view for a collision warning radar is relatively small and so this represents a cost effective method of reducing sidelobes.

Once a substantial percentage of the number of vehicles on the road are fitted with collision warning radar systems, interference may be caused between radar systems operating in the same area. Varying the ramp rate of the FMCW signal between systems might provide some protection to this problem. A further method of providing protection against mutual interference is to link a radar system's transmit frequency lo the direction of travel of the system carrying vehicle. The European frequency allocation for collision warning radar systems is 76 to 77 GHz. This may be subdivided into ten 100 MHz wide channels which are each allocated to a particular 36° wide sector of azimuth angles. Two vehicles which approach head-on would then have a respective radar operating frequency separated from the operating frequency of the other vehicle by 500 MHz. After periodic time intervals a control circuit measures an output signal from either an electronic or mechanical compass. A control signal is then sent to a radar master oscillator to control the operating frequency of the oscillator and hence the transmitted frequency.

Figure 4:
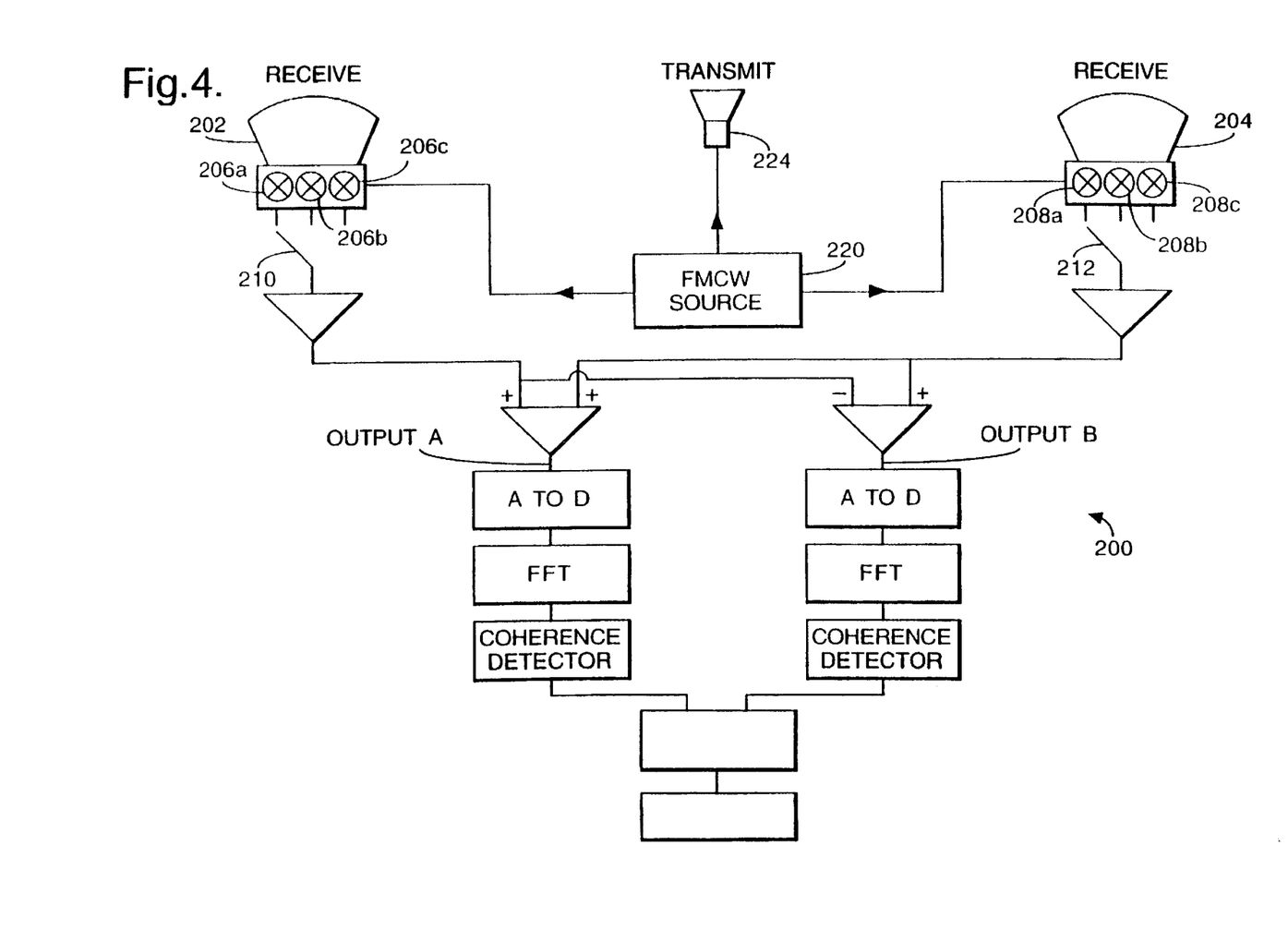
FIG. 4 is a schematic diagram of a further system of the invention.

The radar system 10 incorporates horn type receive antennas 22 and 24. In place of horn type receive antennas, focal plane receivers may be advantageously incorporated into the design of a collision warning radar system. Focal plane receivers are described in UK Patent No. 2279179. FIG. 4 snows a schematic diagram of a radar system of the invention, indicated generally by 200, incorporating focal plane receivers 202 and 204. The radar system 200 is similar to the radar system 10 of FIG. 1 except that the focal plane receivers 202 and 204 each have three receive antenna elements 206a to 206c and 208a to 208c respectively, Each receive antenna element has its own respective output and so switching units 210 and 212 are required to selectively connect the signal processing components to each output in turn.

In the system 200, a FMCW source 220 generates a single sweep FMCW signal which is passed to a conventional waveguide horn type transmit antenna 224 which generates a radar beam which is approximately 10° wide in azimuth and with a sufficiently wide elevation beamwidth to match the field of view of the receivers 202 and 204.

The signal from the FMCW source 220 is passed to each of the receivers 202 and 204. Signals received by the antenna elements 206a to 206c and 208a to 208c after transmission from the transmit antenna 224 and reflection off an object are mixed with the signal from the FMCW source 220 to generate a video-frequency output. Apart from the multiplexing of the receiver output by the switching units 210 and 212, the signal processing for the system 200 is the same as that for the system 10 and will not be described further.

Figure 5A:
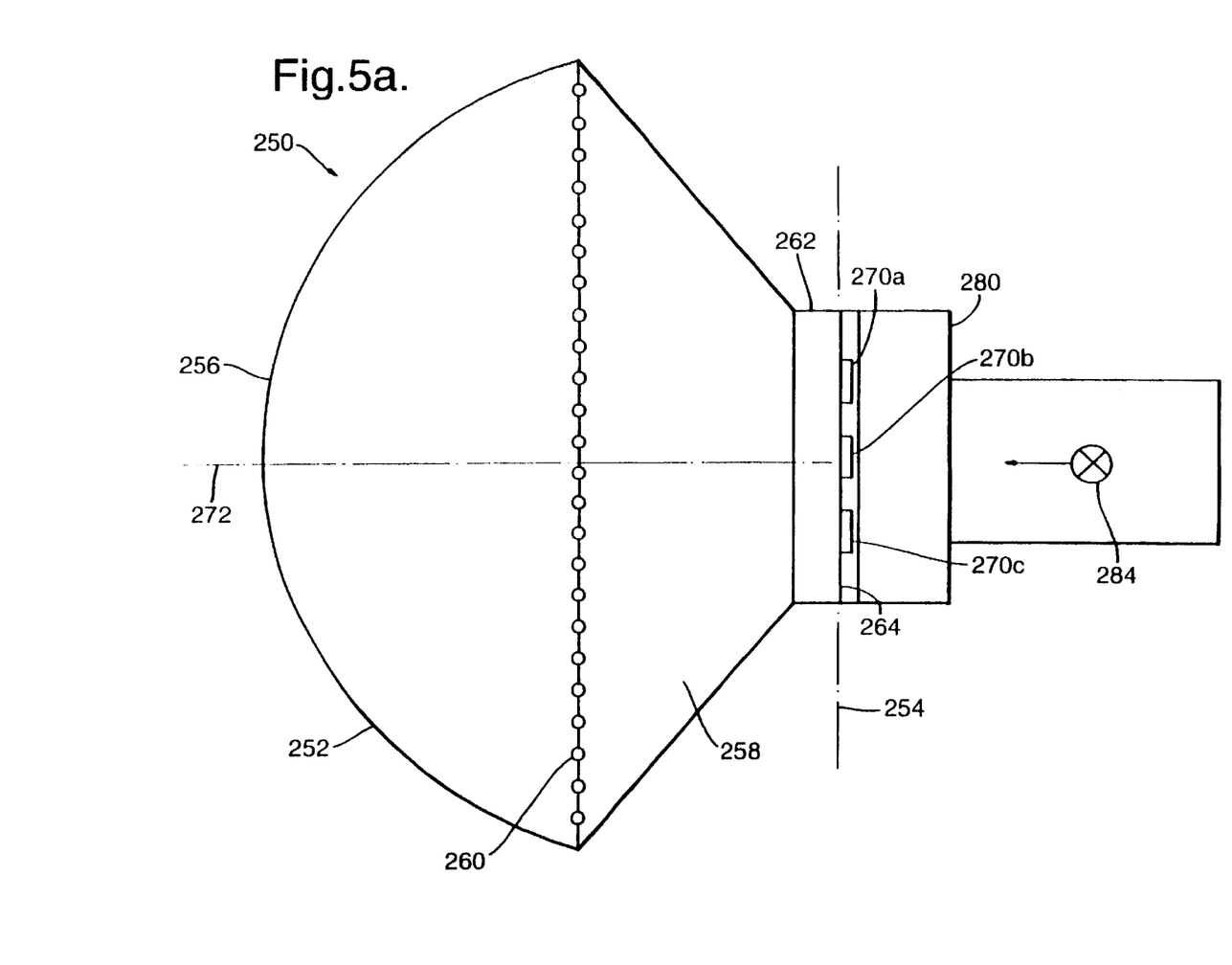
FIG. 5a is a sectional view of a focal plane receiver of the FIG. 4 system.

The receivers 202 and 204 are identical. Referring now to FIG. 5a there is shown a horizontal section of a focal plane receiver, indicated generally by 250. The receivers 202 and 204 are like to the receiver 250. The receiver 250 comprises a lens 252 having a focal plane 254. The lens 252 has a front portion 256, which is an ellipsoidal segment having a maximum diameter of 75 mm. and a rear portion 258 which is frusto-conical in shape. The lens 252 is of a titanium dioxide loaded polystyrene dielectric, a material manufactured by Plessey Semiconductors of Lincoln, England, having a dielectric constant $\epsilon_r$ of 10. The lens 252 incorporates a metal grid 260 sandwiched between the front portion 256 and the rear portion 258. The grid 260 is in the form of a planar array of linear conductors seen end-on in the drawing, which in operation are arranged vertically. An alumina substrate 262 is attached to a rear surface 263 of the rear portion 258. The substrate 262 has an outer surface 264 in the focal plane 254.

Three antenna elements 270a, 270b, and 270c, collectively referred to as the antenna elements 270, are located on the surface 264 of the substrate 262 at the focal plane 254 to provide sensitivity to radiation from three respective look angles. The antenna elements 270 are each a crossed dipole antenna. A central antenna 270b receives radiation arriving parallel to an axis 272 and side antennas 270a and 270c receive radiation from +3° and −3° to the axis 272 respectively. The antenna elements 270 are centred on a single horizontal axis of the focal plane 254, spaced apart by a centre to centre spacing of 1.15 mm. Each dipole is of length 0.85 mm, as appropriate for resonance in a frequency range which includes the frequency range 76 to 77 GHz at an interface between air and the substrate 262. A microwave feed waveguide 280 connected to the FMCW source 220 (not shown) has an open output end 282 close to the substrate 262.

Microwave input power from the FMCW source 220 is fed along the waveguide 280; it is polarised vertically in the plane of the drawing, as indicated by an encircled cross 284. The waveguide provides a local oscillator signal (LO) for the antenna elements 270. Each of the antenna elements 270 is a crossed dipole antenna having two mutually orthogonal planar dipoles comprising a pair of dipole limbs. One of the dipoles of each antenna element is arranged vertically in the plane of the drawing, parallel to the conductors of the metal grid 260, the other dipole is arranged horizontally.

Radiation which is transmitted by the transmit antenna 224 and reflected off an object may be received Dy the receiver 250. The grid 260 acts as a polariser, only allowing horizontally polarised radiation to reach the antenna elements 270 as a receive signal RX.

Figure 5B:
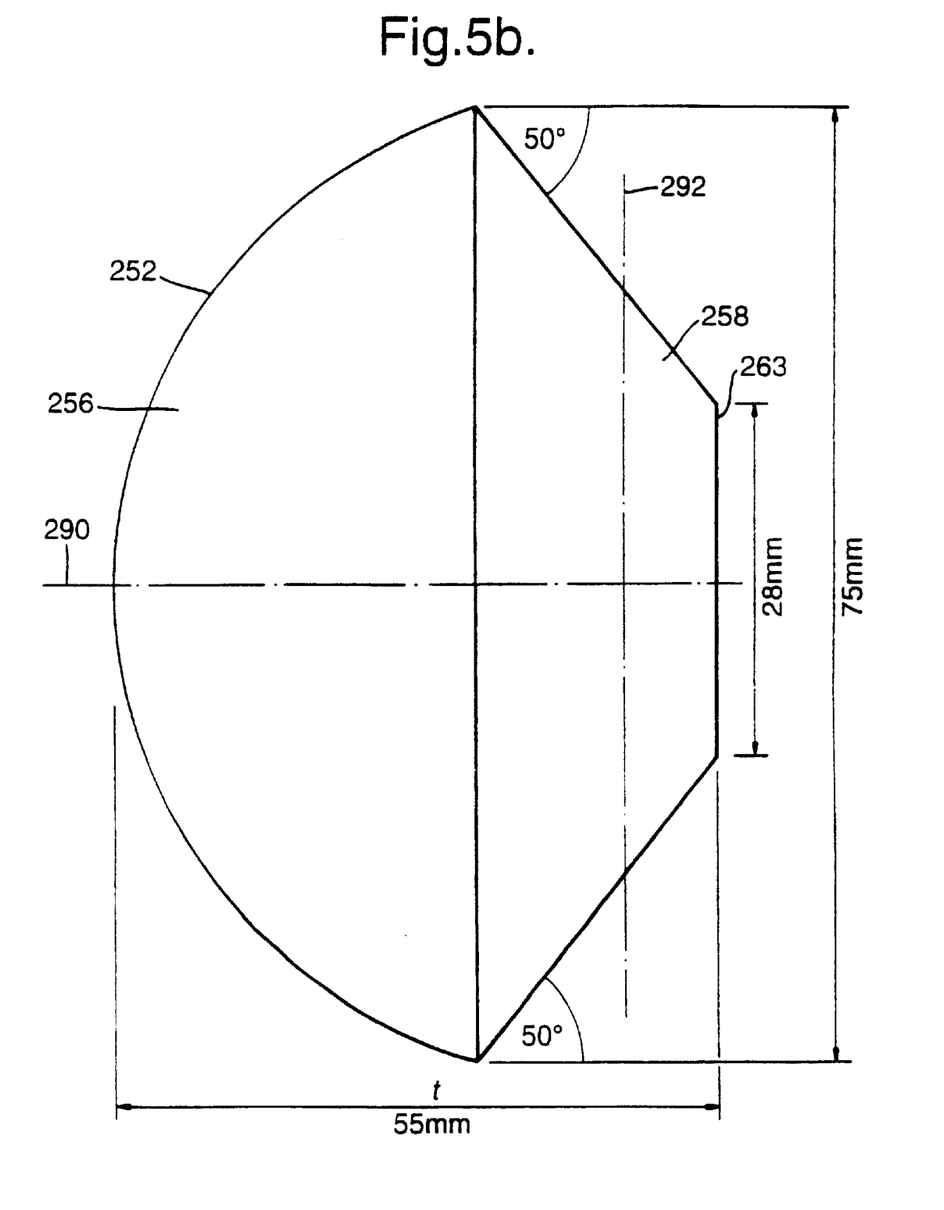
FIG. 5b shows a sectional view of a lens of the FIG. 5a receiver.

FIG. 5D shows a cross-sectional view of the lens 252. The front portion 256 is hypohemi-ellipsoidal in shape, i.e. a fraction of a hemi-ellipsoid, having a major axis 290 of length 82.7 mm, and a minor axis 292 of length 78.3 mm. The frusto-conical rear portion 258 has a curved surface such that in cross-section it subtends an angle of 50° to a line parallel to the major axis. The rear surface 263 is circular and has a diameter of 28 mm. The lens 252 has an overall thickness, t, of 55 mm.

Figure 6:
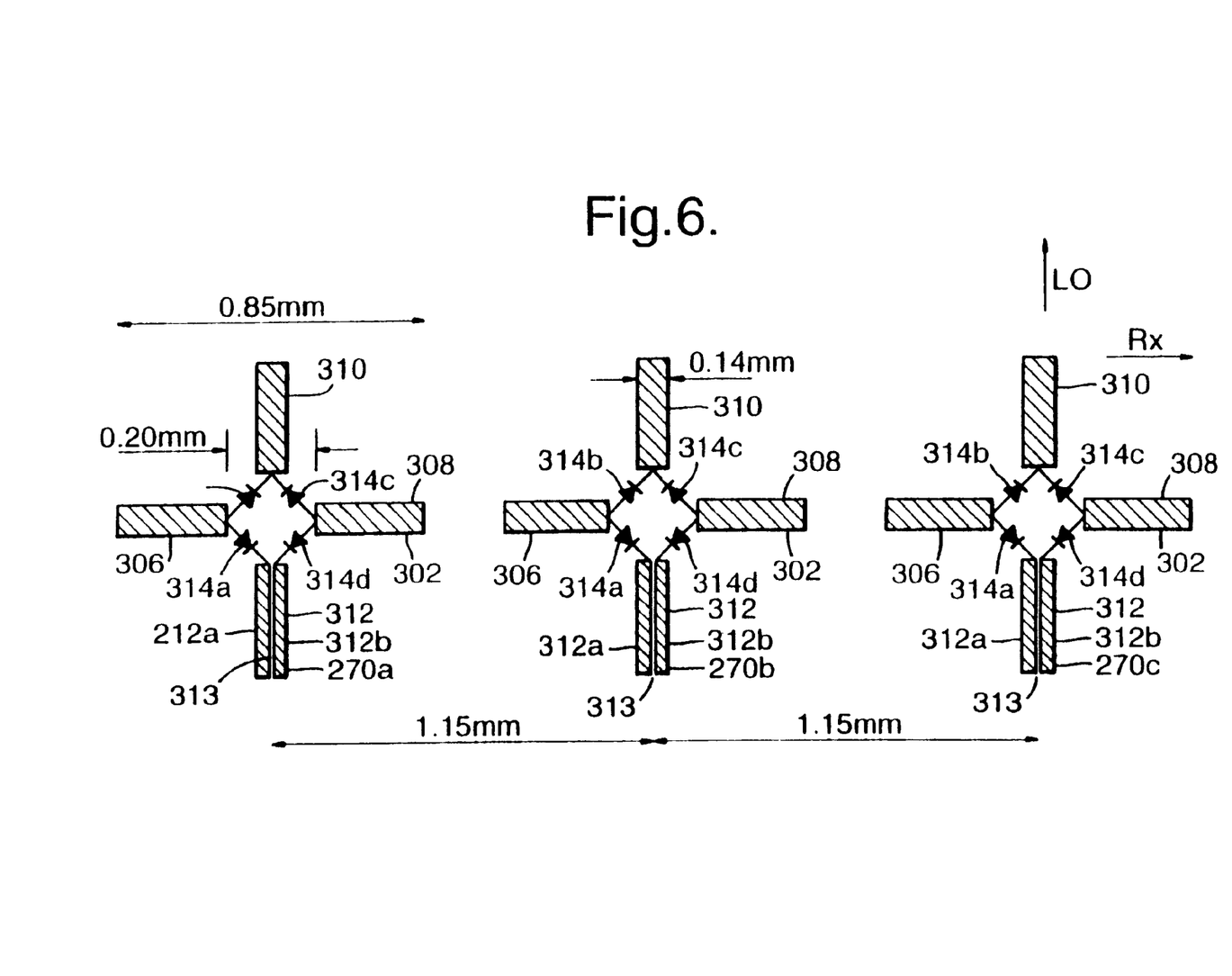
FIG. 6 shows a plan view of antenna elements of the FIG. 5a receiver.

Referring to FIG. 6 also there is shown a plan view of the antenna elements 270a, 270b, and 270c. The antenna elements 270 each comprise two dipoles 302 and 304. The dipoles 302 each comprise two limbs 306 and 308 and dipoles 304 each comprise two limbs 310 and 312. The limbs 306 to 312 are each 0.325 mm in length and 0.14 mm in width. The limbs 312 are each longitudinally divided having two arms 312a and 312b separated by a gap 313, 0.04 mm in width. The antenna elements 270 each have a ring of four radar frequency mixer diodes 314a to 314d connected between respective dipole limbs of different dipoles. The limbs 306 and 308 are connected to the anodes of diode pairs 314a/314b and 314c/314d respectively and the limbs 310 and 312 are connected to the cathodes of diode pairs 314b/314c and 314a/314d respectively. The diodes 314a to 314d are consequently polarised towards the limbs of one dipole and away from the limbs of the other. The arms 312a and 312b of the split limb 312 are connected to respective diodes 314a and 314d.

The dipoles of the antenna elements 270 which incorporate the split limbs are arranged to be parallel to the polarization of the local oscillator signal, The other dipoles are arranged to be parallel to the polarization of radiation transmitted by the grid 260.

The LO and RX signals couple to the dipoles to which their polarizations are parallel. The LO and RX signals are mixed by the diodes 314a to 314d to produce intermediate frequency (IF) signals. The IF signals are at the difference frequency between the LO and RX signals The split limb appears as a single limb at radar frequencies by virtue of capacitive coupling between the limps. At the intermediate frequency however. It acts as two parallel conductors forming a transmission line. The split limb consequently provides an output feed for relaying the IF signals to the processing circuitry. The processing is carried out in a manner previously described in relation to the radar system 10.

Whereas the radar system 10 had eight coherence detectors for each output of the FFT units, the processing circuitry of the system 200 requires three banks of eight coherence detectors for each FFT unit, together with a multiplexing unit for switching the outputs of the FFT unit to an appropriate bank in co-ordination with the switching units 210 or 212 as appropriate Provided suitable data processing capability is provided in the coherence detectors, the multiplexing unit may be dispensed with; the data processing would need to incorporate a means of processing data from each look direction in a time multiplexed manner.

If the cost of added electrical circuitry is not a major concern, the switching units 210 and 212 may be dispensed with and in their place three separate sets of processing circuitry provided—one for each look direction of the receivers 202 and 204.

Figure 7A:
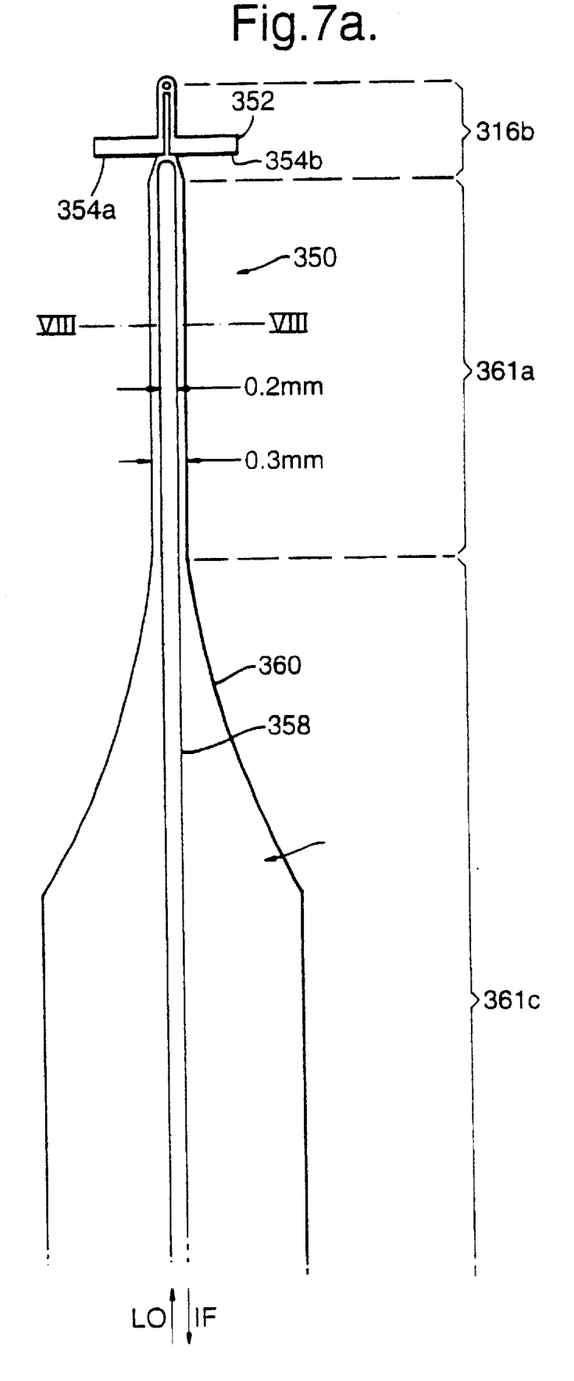
FIG. 7a shows a plan view of an alternative antenna element of the FIG. 5a receiver.
Figure 7B:
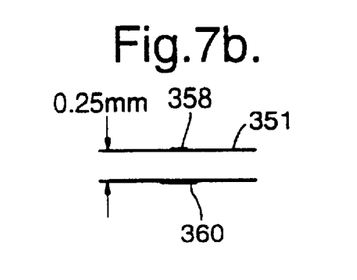
FIG. 7b shows a sectional view of the FIG. 7a antenna element.

In place of the feed waveguide 280 providing a LO signal, the LO signal might be fed directly to the receive antennas. A focal plane receiver incorporating such an arrangement would be similar to the receivers 202 and 204 without the waveguide 280. Referring to FIG. 7a, there is shown a plan view of an alternative antenna element 350 for incorporation in such a receiver. Referring to FIG. 7b also, there is shown a cross section of the antenna element 350 along a line VII—VII in FIG. 7a. The antenna element 350 is mounted on a first side of an alumina substrate 351 and comprises a dipole 352 having two limbs 354a and 354b and a LO signal feed structure 356. The dipole 352 has a width of 0.14 mm and an overall length of 0.85 mm, with each limb 354a and 354b being 0.405 mm in length. The feed structure 356 compasses a first conductor 358 on the first side of the substrate and a second conductor 360 on a second side of the substrate. The first conductor 358 has a constant width of 0.2 mm, whereas the second conductor 360 has a width which varies along its length. Along a central region 361a, the second conductor 360 has a width of 0.3 mm, at an end region 361b it has a width of 0.2 mm, and in a third region 361c the width extends from 0.3 mm to width of approximately 3 mm. The second conductor 360 acts as a ground plane and is connected to earth.

A LO feed signal IS coupled to the first conductor 358. Radiation received by the antenna element 350 after reflection from a remote object is mixed with the LO signal, producing an IF signal which is extracted via the first conductor 358.

Whilst the antenna elements 270 and 350 have been designed so as to operate in the frequency range 76 to 77 GHz, a person skilled in the art of microwave antenna design will appreciate that for operation at other frequencies the dimensions of the components of the antenna elements would have to be modified as appropriate for operation at the desired frequency. Each dipole has an effective length which is its physical length multiplied by the square root of the average of the dielectric constants of the two media on either side of it. For example the dipole 352 has air on one side ($\epsilon=1$) and alumina ($\epsilon=10$) on the other, and so its effective length is 0.85 mm multiplied by $$\sqrt{\frac{1}{2}(10+1)}.$$

This is 2.0 mm which is a half wavelength in free-space of microwave radiation of approximately 75 GHz. If desired, the length of the dipoles may be altered so that they have an effective length of $n\lambda/2$ where $\lambda$ is the free-space wavelength and n is an odd integer. If n were to be greater than 1, the centre to centre spacing of the dipoles would need to be increased, and such an arrangement might not be as efficient.

In alternative embodiments, the systems 10 and 200 described with reference to FIGS. 1 and 4 respectively may be modified such that the FMCW source generates a FMCW signal which has a frequency which is a sub-multiple of the output frequency. For example, the FMCW source may generate a signal which has a frequency one quarter of the output frequency. A frequency multiplier, and advantageously an amplifier, IS then required between the FMCW source and the transmitter. In the above example, a four-times frequency multiplier would be required The signal mixers, such as the mixers 34 and 36 and the antenna elements 270 are arranged to operate on harmonics of the FMCW source frequency; there is no requirement for frequency multipliers between the FMCW source and the mixers.

What is claimed is:

1. A collision warning system having a field of view, said system comprising:

(i) a source of radiation;

(ii) a receiver for receiving radiation emitted by the source and reflected by an object in the field of view and for generating receiver signals in response thereto; and (iii) a processor for processing said receiver signals to determine whether or not an object presents a collision risk, said processor comprising an apparatus for determining from receiver signals measures of sightline rates of objects having a sightline rate greater than a set value in order to distinguish between objects which do and do not present collision risks, sightline rate being defined as rate of change of angular position of the object with respect to the system, wherein (a) the receiver comprises a plurality of antennas; and (b) the processor includes a combiner for combining signals from different antennas to generate composite signals having polar sensitivity responses such that no direction within the system field of view is associated with a null of every polar sensitivity response.

2. A system according to claim 1, wherein said processor includes a phase analyzer for analyzing the phase of said receiver signals and for rejecting signals having a phase history over a processing interval indicative of a sightline rate greater than said set value.

3. A system according to claim 1, wherein said receiver comprises two antennas and wherein said combiner comprises an adder for adding antenna signals from said antennas to form a first composite signal at a first composite output and a subtractor for subtracting one antenna signal from the other to form a second composite signal at a second composite output and wherein the sensitivity maxima of the first composite output's polar sensitivity response are at angles which correspond to angles of sensitivity minima of the second composite output's polar sensitivity response.

4. A system according to claim 3, wherein said processor includes a phase analyzer for analyzing the phase of said receiver signals and for rejecting signals having a phase history over a processing interval indicative of a sightline rate greater than said set value, said phase analyzer comprising:

A-to-D converter for digitizing the first and second composite output signals;

an apparatus for performing a Fast Fourier Transform (FFT) on said digitized output signals and outputting transformed signals to a purality of FFT outputs; and a respective coherence detector connected to each FFT output for comparing the phase angles of successively output transform signals.

5. A system according to claim 4, wherein each coherence detector evaluates the second differential with respect to time of the phase of the transformed signals for comparison with a threshold value.

6. A system according to claim 4, wherein each coherence detector has a processing interval dependent on the FFT output to which it is connected.

7. A system according to claim 1, wherein each of said plurality of antennas comprises a horn antenna.

8. A system according to claim 1, wherein each of said plurality of antennas comprises a focal plane array receiver.

9. A system according to claim 8, wherein each focal plane receiver comprises a receiver device disposed at the focal plane of a microwave lens for receiving microwave radiation from the source, mixing the received radiation with a local oscillator signal and extracting intermediate frequency receiver signals, the device comprising:

(a) dipole receiving apparatus for receiving the radiation and the local oscillator signal;

(b) surface conductors arranged on respective sides of a dielectric substrate for coupling the local oscillator signal from a local oscillator to the dipole receiving apparatus and for extracting the intermediate frequency signal therefrom; and (c) a plurality of diodes connecting the surface conductors to the dipole receiving apparatus.

10. A system according to claim 9, wherein the system incorporates a radiation absorber for attenuating at least one of:

(a) sidelobe radiation emissions from the source of microwave radiation; and (b) radiation reflected from objects in the field of view and susceptible to sidelobe reception at the receiver.

* * * * *